Jan. 23, 1945.  G. E. MOORE  2,367,790
INSULATION BLANKET RETAINER
Filed July 12, 1944

INVENTOR.
GOODLOE E. MOORE.
BY
Lockwood, Goldsmith & Galt,
ATTORNEYS.

Patented Jan. 23, 1945

2,367,790

UNITED STATES PATENT OFFICE 2,367,790

INSULATION BLANKET RETAINER

Goodloe E. Moore, Danville, Ill.

Application July 12, 1944, Serial No. 544,563

5 Claims. (Cl. 20—4)

This invention relates to certain improvements in the mounting of blanket type insulation to wall surfaces such as side walls, ceilings, etc., of building structures, vessels and the like for sound and heat insulation purposes.

Such a blanket may be applied to and retained upon a surface in the manner illustrated in the Spafford Patent No. 1,955,443, dated April 17, 1934, or Christenson Patent No. 2,282,293, dated May 5, 1942, each characterized by a blanket penetrating prong or spindle welded or soldered to the supporting surface to be covered and having the blanket exposed end bent angularly or transversely for blanket retention, such end bearing upon a washer which may be circular, square or rectangular in peripheral outline as desired, and which is centrally apertured to pass the prong free end.

In copending application, Serial No. 492,997, filed July 1, 1943, a continuation in part of Serial No. 478,900 filed March 12, 1943, there is disclosed and claimed a cementitiously applied hanger for insulation blanket retention. Herein the hanger illustrated is substantially that disclosed in the first mentioned application.

In addition to obtaining a wide or larger pressure bearing retention area associated with the bent end of the prong or spindle as disclosed in said patents, the present invention, while not necessarily limited to an adhesively secured prong, is peculiarly effective therewith for the bearing unit or washer is of very thin sheet metal and for its area said washer has insignificant weight. This is of decided advantage when the prongs or spindles are adhesively applied.

Such a light weight, large area washer or retaining plate is corrugated, ribbed or the like for reenforcement purposes.

Such a washer is further grooved for two purposes, one to interlock the angular retaining end of the prong or spindle so that the washer will not rotate when subjected to vibration and the like in boat applications, thus preventing blanket liner or fabric wear, and second, such interlock is of seating character, for nesting such spindle end so that no part thereof projects sufficient for accidental contact therewith.

This is extremely important in boat construction where walls and ceilings are covered and the passageways are narrower and the headroom low. Accordingly personnel, when this invention is employed, cannot become scratched or cut, and clothing, etc. will not become snagged and torn.

Other advantages will appear more fully from the following description.

The chief feature of the present invention resides in the use of a comparatively large area, exceptionally light weight washer wherein a seat or socket is provided to nest or seat the blanket penetrating angular end of the anchoring spindle or prong.

Other objects and features will be set forth more fully hereinafter.

The full nature of the invention will be understood from the accompanying drawing and the following description and claims.

In the drawing

Figure 1:
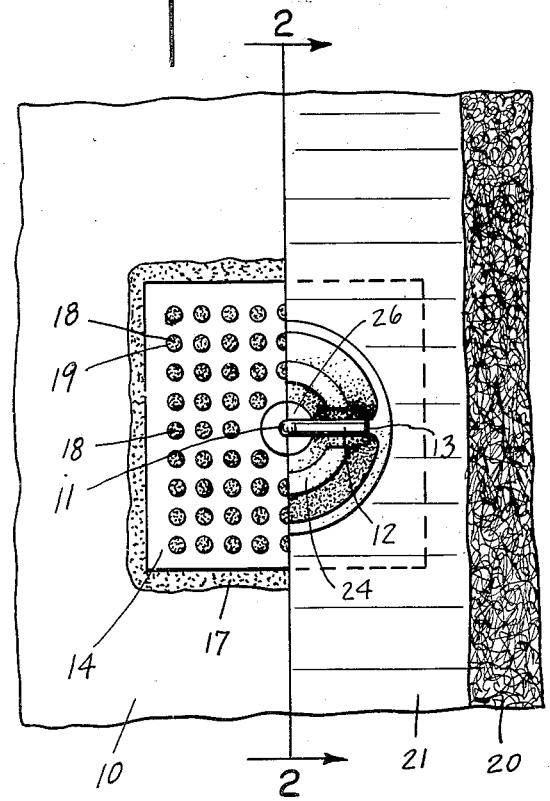
Fig. 1 is an elevational view, one half showing the blanket, etc., and the other half showing the wall to be blanketed, and the spindle anchoring plate adhesively secured thereto.
Figure 2:
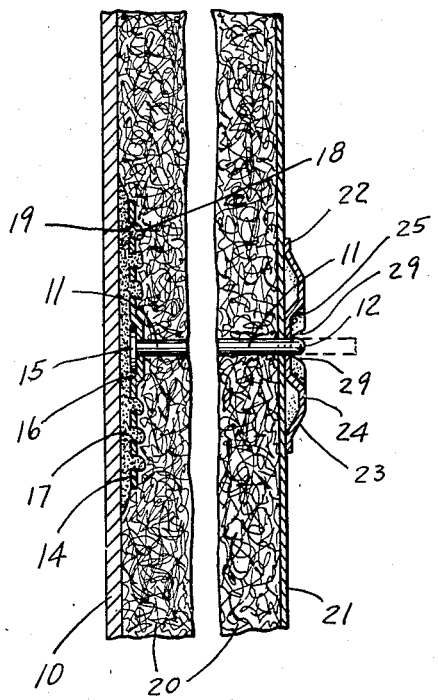
Fig. 2 is a central sectional view taken on line 2—2 of Fig. 1 and in the direction of the arrows.
Figure 3:
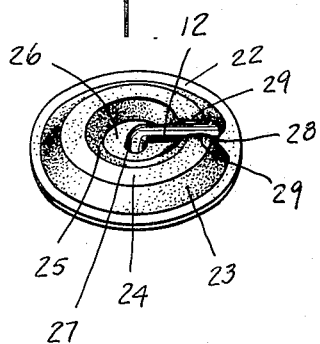
Fig. 3 is a perspective view of the retaining washer and angular retaining end of the spindle or prong.
Figure 4:
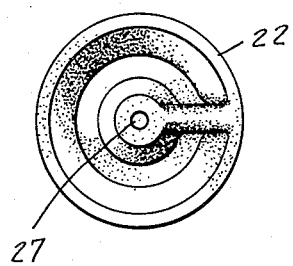
Fig. 4 is a rear view of the washer.

In the form of the invention selected for illustration, same is shown of the adhesively secured hanger embodying type. Herein 10 indicates a wall or surface to be covered or blanketed. A hanger has spindle or prong portion 11 and blanket exposed angular end 12 with a sharp edge 13. The opposite end is passed through apertured anchoring base plate 14 and is enlarged as at 15, such enlargement seating in the plate embossment 16. The plate, and spindle preferably are welded together.

17 indicates the layer of adhesive that secures the plate to the surface. 18 indicates adhesive portions extended into and through apertures 19 in plate 14. All of the aforesaid is disclosed in the first mentioned application. The blanket may be of mineral wool, fibre glass or comparable material 20 backed by a paper or fabric lining 21.

Herein a light weight (approximately 28 gauge) metal washer has a circular peripheral outline with a bearing portion 22, an inclined portion 23, an intermediate flat portion 24, a reversely inclined portion 25 and a central portion 26 centrally apertured as at 27 for prong passage. Portions 22 and 26 are coplanar. Portions 23, 24 and 25 form a concentric corrugation in the washer and stiffen same.

A radial groove is formed in this corrugation and the root 28 thereof also is coplanar with portions 22 and 26. The groove forming ends 29 of the corrugation provide with portion 28 a seat to nest the angular end 12 of spindle 11.

Ends 29 prevent washer rotation about the spindle when the end 12 thereof is seated in the groove. The free end 13 of the bent end terminates short of the outer end of the groove so that no sharp projection is exposed for snagging, cutting or tearing. The height of the corrugation, and accordingly the depth of the groove, is just about the diameter of spindle 11 so that a comparatively smooth exposed unit formation results.

The blanket is mounted and retained upon spindle 11 substantially as described in the Spafford patent aforementioned with the addition that the groove in the washer is registered with the bent end to effect the assembly as herein illustrated.

While the invention has been illustrated and described in great detail in the drawing and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. Structure for mounting an insulating blanket upon a surface by means of a blanket penetrating spindle suitably secured to the surface to be covered comprising an apertured, light weight, comparatively large area blanket bearing member having a corrugated portion about the aperture in said member and a groove in said portion, the free and blanket exposed end of the spindle being disposed angularly of the blanket enveloped portion of the spindle and seated in the groove of said member.

2. Structure as defined by claim 1 characterized by the immediate end of the angular portion of the spindle terminating short of the outer end of the groove.

3. Structure as defined by claim 1 characterized by the member being of circular peripheral outline with a substantially circular corrugation therein, the groove of the member being radially directed.

4. Structure as defined by claim 1 characterized by the member being of circular peripheral outline with a substantially circular corrugation therein, the groove of the member being radially directed, the outermost and central portions of the members being coplanar, and the depth of the groove being approximately the diameter of the angular portion of the spindle.

5. Structure as defined by claim 1 characterized by the member being of circular peripheral outline with a substantially circular corrugation therein, the groove of the member being radially directed, the outermost and central portions of the members being coplanar, and the depth of the groove being approximately the diameter of the angular portion of the spindle, the free end thereof terminating short of the outer end of the radial groove.

GOODLOE E. MOORE.